United States Patent
Ehms et al.

(10) Patent No.: US 9,256,671 B2
(45) Date of Patent: Feb. 9, 2016

(54) ESTABLISHING OF A SEMANTIC MULTILAYER NETWORK

(75) Inventors: Karsten Ehms, Munich (DE); Walter Christian Kammergruber, Munich (DE)

(73) Assignee: SIEMENS AKTIENGESLLSCHAFT, Munich (DE)

( * ) Notice: Subject to any disclaimer, the term of this patent is extended or adjusted under 35 U.S.C. 154(b) by 2197 days.

(21) Appl. No.: 12/073,064

(22) Filed: Feb. 28, 2008

(65) Prior Publication Data

US 2009/0049179 A1 Feb. 19, 2009

(30) Foreign Application Priority Data

Aug. 14, 2007 (DE) .......................... 10 2007 038 347

(51) Int. Cl.
*G06F 15/16* (2006.01)
*G06F 17/30* (2006.01)

(52) U.S. Cl.
CPC ................ *G06F 17/30731* (2013.01)

(58) Field of Classification Search
CPC ....................... H04N 21/4331; H04N 21/4316
USPC ............ 709/227, 228; 719/316; 715/234, 738
See application file for complete search history.

(56) References Cited

U.S. PATENT DOCUMENTS

| | | | |
|---|---|---|---|
| 8,849,945 B1 * | 9/2014 | Desjardins | G11B 27/031 709/217 |
| 2003/0163597 A1 * | 8/2003 | Hellman | G06F 17/30557 719/316 |
| 2004/0148278 A1 * | 7/2004 | Milo et al. | 707/3 |
| 2007/0174247 A1 * | 7/2007 | Xu | G06F 17/30722 |
| 2008/0294678 A1 * | 11/2008 | Gorman et al. | 707/102 |

OTHER PUBLICATIONS

"Semantic Networks"—John F. Sowa http://www.jfsowa.com/pubs/semnet.htm Jun. 2, 2006.*
"Multilayered Semantic Social Network Modeling by Ontology-Based User Profiles Clustering: Application to Collaborative Filtering"—Cantador et al, Universidad Autónoma de Madrid, May 2006 http://ir.ii.uam.es/~mesh/publications/ekaw06.pdf.*

* cited by examiner

Primary Examiner — Randy Scott
(74) Attorney, Agent, or Firm — Staas & Halsey LLP

(57) ABSTRACT

A semantic multilayer network is established, wherein a first layer in said semantic multilayer network including tag annotations, and a second layer in said semantic multilayer network including data structured by an ontology, are established and wherein the first layer and the second layer are connected. Thus, connecting of two entirely different worlds of the dynamic, emergent "social tagging" (e.g., web applications like Web 2.0) and of the regular "ontology engineering" (e.g. Semantic Web) data, dynamic data tag annotations and ontology, seen as too opposed or conflictive, therefore being treated separately and independently so far, becomes possible. Here, by utilizing advantages of both worlds, computer aided handling of large amounts of data, including e.g. processing, management, or querying of data, becomes considerably efficient and effective, wherein said data may be distributed in different areas, locations, or systems.

15 Claims, 1 Drawing Sheet

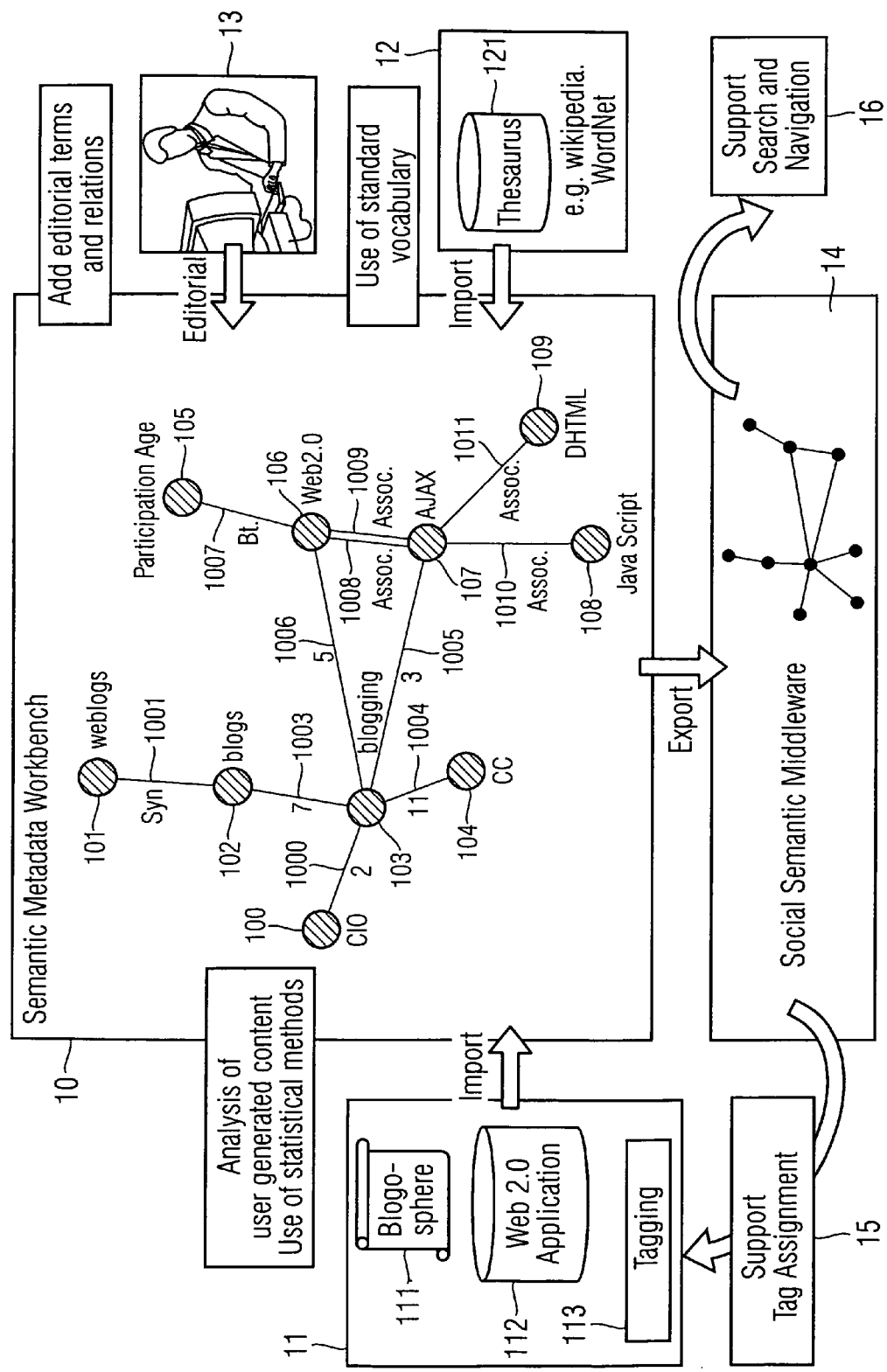

US 9,256,671 B2

ESTABLISHING OF A SEMANTIC MULTILAYER NETWORK

CROSS-REFERENCE TO RELATED APPLICATIONS

This application claims the benefit of German Application No. 10 2007 038 347.0 filed on Aug. 14, 2007, the disclosure of which is incorporated herein by reference.

BACKGROUND

The present invention relates to a semantic multilayer network and to establishing of the semantic multilayer network. In particular, the present invention relates to a method for establishing the semantic multilayer network, to use of the semantic multilayer network in further applications, etc.

In everyday life, large amounts of data and information have to be managed. The large amounts of data are unimaginable without the use of computing devices adapted to deal with the data through the use of several concepts for data structuring and representation.

For this reason, data representation by use of "social tagging" or ontologies has been provided. Characteristics of dynamic "social tagging" and of ontologies established or provided by engineers have been so far incompatible.

A tag is a (relevant) keyword or term associated with or assigned to a piece of information or data (e.g., a picture, a geographic map, a blog entry, or a video clip), thus describing the item and enabling keyword-based classification and search of information. The piece of information or data may be associated with several tags and vice versa. Describing of information or data by appropriate tags is called tagging. In particular, as regards tagging, an end user extends and changes within a continuous development process a vocabulary of tags within an application. During this process, a network of tags is established.

While using tags in such an organizational system is flexible and easy, tagging is not without its drawbacks. Disadvantages of tagging are, for example, absence of conciseness and structure (e.g., semantics) within the vocabularies (called among others tag clouds). Sources of said disadvantages are, for example, erroneous spelling, use of singular vs. plural forms, compositions of words with different separators (e.g., "-", "_", or "."), abbreviations, synonyms, or multilingualism.

Further, typically there is no information about the meaning or semantics of a tag. This lack of semantic distinction in tags can lead to inappropriate connections between items. Additionally, selection and assigning of tags is a highly individualistic issue, as different people may use drastically different terms to describe the same concept, information, or data.

A further concept of knowledge representation in a computing device is ontology. An ontology is a data model that represents a set of concepts within a domain and the relationships between those concepts. It is used to reason automatically about the objects within that domain.

In the past or so far, an ontology was established and managed separately, i.e., out of application software or a package. In general, it is performed by use of tools for establishing or creating ontologies, wherein the tools are directed rather to experts of knowledge engineering than to end users.

Disadvantages of ontologies are, for example, the following facts: normally, ontologies may be created by knowledge engineers only; creation of ontologies requires especial ontology editors; creation of ontologies requires long time; and, due to high expenditure of time, the ontologies once created are adjusted or adapted only rarely.

SUMMARY

Starting with applications dealing with rather unstructured data, like web-based applications and hosted services such as social-networking, wikis, folksonomies, Web 2.0, for example, and by use of weblog contents, an annotation to be optimized with regard to quality should be supported by analysis and structuring of tags, wherein available meta data from a productive system are used and accumulated semi-automatic such that a concrete benefit is provided to user. This benefit may be, for example, that a user-oriented navigation help can be provided to use the created structure information as basis for a semantically-aided search, i.e., to allow a faceted filtering of large amounts of information.

It is an object to connect the power of the different worlds of rather ustructured data, like Web 2.0 for example, comprising tag annotations and of structured data or ontologies, like Semantic Web for example, to avoid the corresponding weaknesses and to allow an improved dealing with large amounts of data.

So far, the worlds of the dynamic, emergent "social tagging" (e.g., web applications like Web 2.0) and of the regular "ontology engineering" (e.g. Semantic Web) are separated.

The present inventors propose a method for establishing a semantic multilayer network, said method comprising: establishing a first (kind of) layer in said semantic multilayer network, said first layer comprising tag annotations; establishing a second (kind on layer in said semantic multilayer network, said second layer comprising data structured by an ontology; and connecting said first layer and said second layer.

By handling the differently structured data in different levels of a semantic network, a flexibility with regard to possible extensions to further tag or meta data annotations, ontologies, and other kinds of more or less structured (meta) data becomes possible. Thus, beside an elegant connection of differently structured data also an effective and flexible way of extension or establishing of a semantic network can be achieved.

According to an embodiment, relations between said tag annotations of said first layer are determined. In this way the tag annotations, previously rather unstructured, become a structured form. The determining can be performed, for example, by use of at least one statistical method. During or beside the determination of relations also a weighting of said relations can be performed. Thus, the rather unstructured tag data becomes more structured not only by connecting this data with structured one but additionally also by introducing more structure within this data itself. At the same time, the advantages of tagging are maintained.

Further, according to an embodiment, a third (kind of) layer in said semantic multilayer network can be established, said third layer comprising structured data provided by a user. This data provided by a user can be used to upgrade the tag annotations of the first layer.

Furthermore, the inventors propose a semantic multilayer network including a first layer comprising tag annotations; a second layer comprising data structured by an ontology; and connections between tag annotations of said first layer and data of said second layer. The semantic multilayer network is established by use of the method sketched above and explained in more detail below.

The semantic multilayer network may be used for several purposes, e.g., for supporting tag assignment and/or for supporting search for and navigation of data.

A computer program product includes a code, wherein the code is configured to implement the method introduced shortly above and explained in more detail below. The computer program product may be comprised in a data carrier.

Furthermore, a data carrier may have computer program product mentioned above.

According to an embodiment, a data base can be configured to represent the semantic multilayer network. Thus, also advantages of use of a data base can be incorporated.

Moreover, a computer system may be configured to represent the semantic multilayer network. The computer system may be configured to establish said semantic multilayer network by use of the method sketched above and described in more detail below. The computer system may be also configured to support tag assignment by use of the semantic multilayer network and/or to support search for and navigation of data by use of the semantic multilayer network.

The methodology according to an embodiment comprises a semantic middleware, connecting semantic information from different sources and managing the (connected) semantic information in separate layers.

The life time cycle of the layers, i.e., the life cycle of the data comprised in said layers, may be quite different—life time variable till life time invariant. Thus, it is allowed for continuous adapting and extending certain terms/vocabularies from online applications by user (e.g., when tagging is used), while in other domains a certain form of secured or saved knowledge in ontologies is specified.

The corresponding layers of the semantic network are created and/or modified by different methodologies related to information technology. Such methodologies may be based on automatic, semi-automatic, and/or manual performance. For example, methods of statistical analysis and/or manual input provided by editors may be used. The logical connection between the layers of the semantic network can be achieved in several ways. Therefore, explicit manual approaches as well as automatic approaches like pattern matching methodologies may be used.

The different life time cycle of the data, information, or contents of the corresponding layers of the semantic network may be maintained also with regard to the connections between the corresponding layers or data of the corresponding layers, respectively. Thus, updating of one layer or of data of one layer, respectively, can be performed independent from the other layers or data of other layers.

The same refers also to use of such a semantic multilayer network as a social semantic middleware, wherein the semantic multilayer network can be used as a social semantic middleware in any application environment. Object of such a use could be, for example, improvement of a search for, navigation in or placing of metadata. Within the semantic middleware, the layers of the semantic network are available as a whole or at least as marked as a whole. The information or data of the layers of the semantic network, which can be represented as nodes or edges of the semantic network, is marked with regard to the layer the information or data corresponds to. The layers of the semantic network within the semantic middleware can, thus, also be used with regard to the corresponding entirety of the layers. Further, it is possible to assign different weights to relations in the semantic network. For example, relations established manually, e.g., by an expert, may be weighted with a higher weight than relations generated automatically. In such a case, a search within the semantic network can be performed with regard to the weights assigned to the relations.

Marking of a node with regard to its origin layer in the semantic network can be performed, for example, by setting a corresponding attribute. Thus, belonging of a node to a layer may be retrieved by an explicit checking of the corresponding attribute.

A further possibility of how to request if a node belongs to a layer in the semantic network could be provided by examination of types of relations leading to the node and by deriving the belonging by the examination results.

In this way, connecting of less structured and highly structured meta data can be achieved. Thus, quality of metadata is improved. Further, both a variable domain knowledge and assured or more static domain knowledge can be connected together into one semantic network.

Additionally, when turning to specific applications, integration of rather unstructured web applications like Web 2.0 and of semantic web applications into one common semantic network becomes possible.

Furthermore, "out of vocabulary"-bottle necks with regard to voice recognition or voice processing can be solved.

BRIEF DESCRIPTION OF THE DRAWINGS

These and/or other aspects and advantages will become apparent and more readily appreciated from the following description of the taken in conjunction with the accompanying drawing in which:

The FIGURE schematically illustrates establishing of a semantic multilayer network and use of the semantic multilayer network according to potential the embodiments.

DETAILED DESCRIPTION OF THE EMBODIMENTS

Reference will now be made in detail to the embodiments, examples of which are illustrated in the accompanying drawings, wherein like reference numerals refer to the like elements throughout. The embodiments are described below to explain the present invention by referring to the figures.

According to the exemplary provided schema of the FIGURE, three different layers of a semantic multilayer network from different kinds of data sources are established and connected. The semantic middleware or semantic multilayer network provided in this way are then provided for further use in further applications or for further data requests, searches and/or navigation.

The first layer of the semantic multilayer network is established by use of tag annotations, for example, by tag annotations 11, 113, 100, 101, 102, 103, 104, 106, 107 concerning user generated content (UGC) referring to various kinds of media content, which are produced by end-users. These tag annotations may be imported, for example, from a web application 112 like a blogging platform 111, for example. By use of statistical methods, it is possible to determine interrelations 1000, 1003, 1004, 1005, 1006 between the tags. In particular, when determining interrelations 1000, 1003, 1004, 1005, 1006 (user generated) content will be analysed with regard to the tags, for example the co-occurrence of tags. Additionally statistical analysis with regard to several criteria like experience of authors or users of data on a field related to the corresponding tag and so on may be applied. The interrelations 1000, 1003, 1004, 1005, 1006, created in this way, may be additionally determined in terms of weighted relations. In the FIGURE, some exemplary weights are assigned to the determined relations 1000, 1003, 1004, 1005, 1006. The relations 1000, 1003, 1004, 1005, 1006 created automatically represent an automatically generated semantic of this first tag annotation layer. As applications using tags, e.g., web applications like Web 2.0, may arrive at several thousand of new entries per day, an update cycle can be performed with regard to this layer time to time to keep tag annotations up to date.

According to the embodiment, an editorial data layer is established. The editorial data 13, 101, 102, 105, 106, 107 are data created and provided manually by editors and represent new and/or additional terms and relations modelled explicit. This data 13, 101, 102, 105, 106, 107 can be used to improve the quality of the automatically generated semantic of the tag layer. Thus, for example, some of the created relations 1000, 1003, 1004, 1005, 1006 or some of the tags 113, 100, 101, 102, 103, 104, 106, 107 of the tag layer may be confirmed by the editorial data additionally. In such a case, the weight of the corresponding relation could be increased to visualise the strength and the correctness of the corresponding relation in more detail. In the FIGURE, relations provided by editors are relations 1001, 1007, 1008. By these relations 1001, 1007, 1008 tag annotations 102, 106, and 107 of the tag layer are confirmed.

As regards the frequency of updating of the editorial data layer, it could be performed something infrequently in comparison to the frequency of updating of the tag layer as establishing of current editorial data is performed by editors, needing more time for this issue.

According to the embodiment, a further layer comprising structured data like data from an ontology is established. In the present embodiment structured data 12, 106, 107, 108, 109 from a thesaurus 121, like wikipedia or WordNet, for example, are taken for this purpose. These structured data are docked to the terms (tags, editorial data) of the other layers, wherein connections between the structured data and the terms of the other layers (e.g., tag layer and/or editorial layer) are established. In this way, ontology relations or, as in this case, thesaurus relations like broader term, narrower term, synonym, or association, for example, are introduced into the semantic multilayer network. In dependence of dynamics of the vocabulary of the ontology or thesaurus, import of this structured data will be performed either once or will be repeated.

The process of establishing of the semantic multilayer network may be performed by use of a semantic metadata workbench 10. The semantic multilayer network 14 established in that way can be provided for a further use by other applications 15, 16. Thus, the semantic multilayer network 14 may be used to support further tag assignment 15. Here, when creating tags for user data, proposals for adequate and applicable tags may be generated by use of the already available knowledge in the semantic multilayer network comprising structured metadata. Additionally, search for and navigation of data 16, in particular user data, may be performed by use of the semantic multilayer network in an effective and intelligent, knowledge supported way.

According to an embodiment, the semantic multilayer network may be stored in a database. Thus, advantages of a database management system may be used, in particular, with regard to the flexibility of managing and requesting data.

The FIGURE can be also seen as a kind of architecture of a computer system comprising the semantic metadata workbench 10 for establishing the semantic multilayer network 14. Further, also the support for tag assignment 15 and support for search and navigation 16 can be seen as parts of the computer system. As already mentioned above, the multilayer network 14 may be stored in a database 14, which also could belong to the computer system.

Thus, the inventors propose establishing of a semantic multilayer network, wherein a first layer in said semantic multilayer network, said first layer comprising tag annotations, and a second layer in said semantic multilayer network, said second layer comprising data structured by an ontology, are established and wherein said first layer and said second layer are connected. Thus, connecting of two entirely different worlds of the dynamic, emergent "social tagging" (e.g., web applications like Web 2.0) and of the regular "ontology engineering" (e.g. Semantic Web) data, dynamic data tag annotations and ontology, seen as too opposed or conflictive, therefore being treated separately and independently so far, becomes possible. Here, by utilizing advantages of both worlds, computer aided handling of large amounts of data, including e.g. processing, management, or querying of data, becomes considerably efficient and effective, wherein said data may be distributed in different areas, locations, or systems.

It is noted that the present invention is not restricted to the above embodiments. In particular, it can be applied in connection with any application providing tag annotations and any application providing structured data like ontologies. Furthermore, it is possible to involve several layers of structured data or of tag annotations into the semantic multilayer network. The embodiments presented above may, thus, vary within the scope of the attached claims in dependence of the environment or concrete system.

The embodiments can be implemented in computing hardware (computing apparatus) and/or software, such as (in a non-limiting example) any computer that can store, retrieve, process and/or output data and/or communicate with other computers. The processes can also be distributed via, for example, downloading over a network such as the Internet. The results produced can be output to a display device, printer, readily accessible memory or another computer on a network. A program/software implementing the embodiments may be recorded on computer-readable media comprising computer-readable recording media. The program/software implementing the embodiments may also be transmitted over a transmission communication media such as a carrier wave. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

What is claimed is:

1. A method for establishing a semantic multilayer network, said method comprising:
    establishing a first layer in said semantic multilayer network, said first layer comprising tag annotations;
    establishing a second layer in said semantic multilayer network, said second layer comprising data structured by an ontology;
    establishing a third layer in said semantic multilayer network, said third layer comprising structured data provided by a user;
    determining relations between the tag annotations of the first layer and the structured data provided by the user in the third layer and weighting the relations;
    connecting said first layer and said second layer; and
    processing or querying data, executed by a processor, using the semantic multilayer network.

2. The method according to claim 1, further comprising determining relations between said tag annotations of said first layer.

3. The method according to claim 2, wherein said determining is performed by use of at least one statistical method.

4. The method according to claim 2, wherein the relations between said tag annotations comprise weighting of said relations.

5. The method according to claim 1, further comprising upgrading said tag annotations of said first layer by use of said structured data provided by the user of said third layer.

6. A semantic multilayer network comprising:
a first layer comprising tag annotations;
a second layer comprising data structured by an ontology;
a third layer comprising structured data provided by a user;
relations between the tag annotations of the first layer and the structured data provided by the user in the third layer;
connections between the tag annotations of said first layer and the data of said second layer; and
a computer weighting the relations and implementing the first and second layers and the connections,
wherein the computer processes or queries data using the semantic multilayer network.

7. The semantic multilayer network according to claim 6, further comprising relations between said tag annotations of said first layer.

8. The semantic multilayer network according to claim 7, wherein the relations are determined by use of at least one statistical method.

9. The semantic multilayer network according to claim 7, wherein the relations between said tag annotations are weighted relations.

10. The semantic multilayer network according to claim 6, wherein said tag annotations of said first layer are upgrades using said structured data provided by the user.

11. A non-transitory computer readable medium storing a program for controlling a computer to execute a method for establishing a semantic multilayer network, the method comprising:
establishing a first layer in said semantic multilayer network, said first layer comprising tag annotations;
establishing a second layer in said semantic multilayer network, said second layer comprising data structured by an ontology;
establishing a third layer in said semantic multilayer network, said third layer comprising structured data provided by a user;
determining relations between the tag annotations of the first layer and the structured data provided by the user in the third layer and weighting the relations;
connecting said first layer and said second layer; and
processing or querying data, executed by a processor, using the semantic multilayer network.

12. The computer readable medium according to claim 11, wherein said method further comprises determining relations between said tag annotations of said first layer.

13. The computer readable medium according to claim 12, wherein said determining is performed by use of at least one statistical method.

14. The computer readable medium according to claim 12, wherein the relations between said tag annotations are determined by weighting of said relations.

15. The computer readable medium according to claim 11, wherein said method further comprises upgrading said tag annotations of said first layer by use of said structured data provided by the user of said third layer.

* * * * *